United States Patent [19]
Muller

[11] 3,727,662
[45] Apr. 17, 1973

[54] VEHICLE ANTI-SKID DEVICE

[76] Inventor: Fritz Muller, Gruneggstrasse 38b, 6000 Luzern, Switzerland

[22] Filed: Feb. 12, 1971

[21] Appl. No.: 114,806

[30] Foreign Application Priority Data

Mar. 9, 1970 Switzerland..........................3402/70

[52] U.S. Cl.................................................152/222
[51] Int. Cl..............................................B60c 27/02
[58] Field of Search.......................152/221, 222, 216

[56] References Cited

UNITED STATES PATENTS 3,093,180  6/1963  Jones, Jr...............................152/216
1,441,113  1/1923  Pepper..................................152/221

FOREIGN PATENTS OR APPLICATIONS 1,368,348  6/1964  France...................................152/216

*Primary Examiner*—James B. Marbert
*Attorney*—Werner W. Kleeman

[57] ABSTRACT

An anti-skid device for vehicles which comprises a support which can be attached to a part of the vehicle, typically the wheel, the hub or to the wheel axle, and at which support there are attached both ends of a number of anti-skid elements, in the form of helical spring brackets or straps which extend in substantially star-like configuration from the support and are flexed over the tread of the tire. According to an important aspect of the instant development at the region of the side wall of the tire and near the tread thereof, there is provided a respective connection element which extends in the peripheral direction of the tire between each two neighboring resilient arms of the helical spring brackets or straps, but between resilient arms which do not belong to the same helical spring bracket or strap.

6 Claims, 9 Drawing Figures

INVENTOR
FRITZ MÜLLER

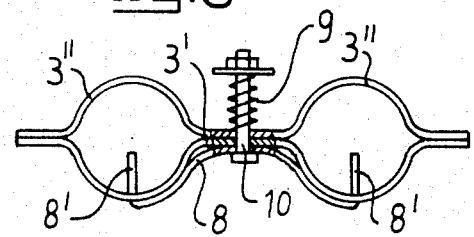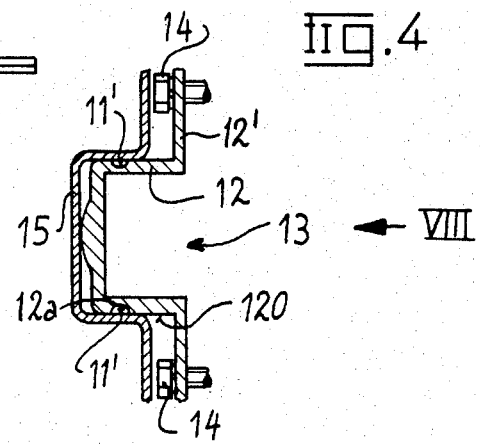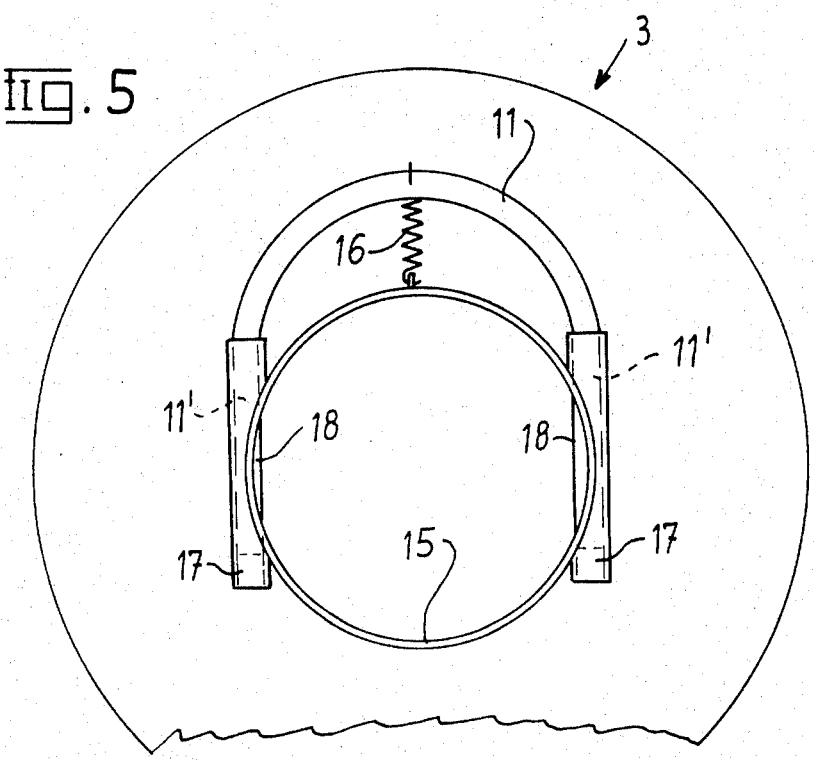

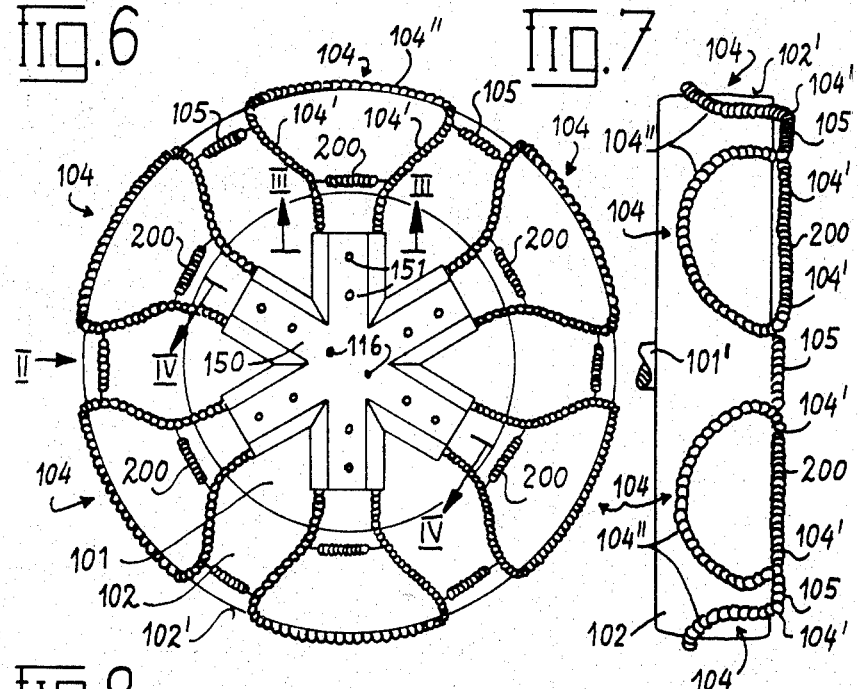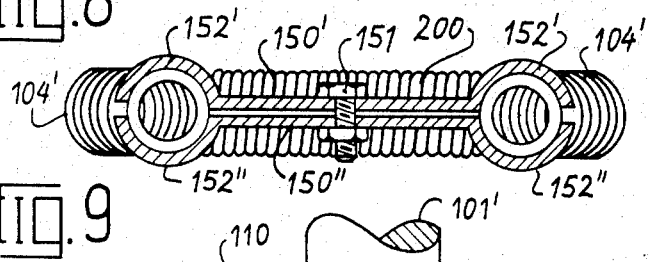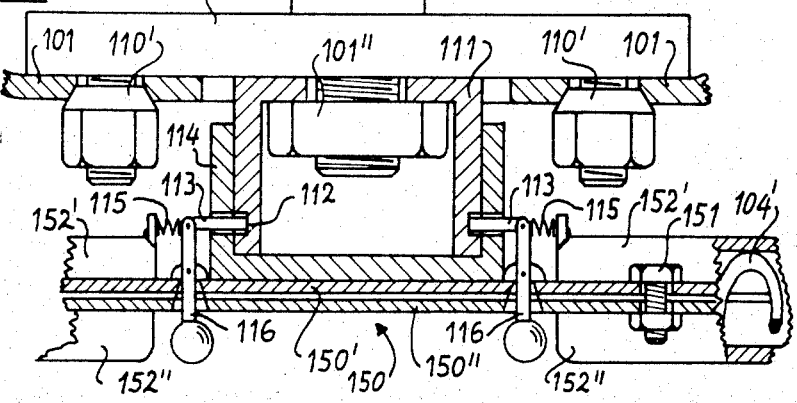

VEHICLE ANTI-SKID DEVICE

BACKGROUND OF THE INVENTION

The present invention relates to a new and improved anti-skid device for the wheels or tires of motor vehicles which is of the type incorporating a support which can be attached to a part of the vehicle, specifically either at the wheel, at the hub or at the wheel axle, at which support there are secured both ends of respective ones of a plurality of helical or spiral spring brackets or straps which protrude from the support in a substantially star-like configuration and are flexed over the tread of the tire.

This general type of anti-skid device is already known to the art and has been found to be useful in actual practice, although under the most pronounced conditions of use it has displayed certain drawbacks.

Thus, it can occur that under certain load conditions each resilient strap portion, which is flexed about the tread of the tire to serve as the anti-skid body, possesses the tendency of laterally displacing or rocking, because such is only secured at the outside of the wheel to the support, and not as is the case for snow chains at both sides of the wheel.

SUMMARY OF THE INVENTION

Now, experiments have surprisingly shown that is there is provided a connection at the region of the side wall of the tire between two neighboring spring arms of the anti-skid bodies, which spring arms do not belong to the same spring strap, then the above-described disadvantageous tendency of the spring strap portions to displace or to pivot or rock can be surprisingly counteracted and the stability of the anti-skid device appreciably increased.

Hence, it is a primary object of this invention to provide an improved anti-skid device of the character described which is not associated with the aforementioned drawbacks of the prior art constructions discussed heretofore.

Still another and more specific object of the instant invention relates to an improved type of anti-skid device utilizing substantially radially extending and star-like configured helical spring straps forming the anti-skid elements and wherein means associated in a particular way with these helical spring straps prevents undesired shafting of these anti-skid elements and improves the overall stability and functionality of the anti-skid device.

Accordingly, in order to implement the above objects of the invention, as well as others which will become more readily apparent from the following description, the invention contemplates the provision of an anti-skid device of the aforementioned type in which at the region of the side walls of the tire and preferably as close as possible to the tread thereof, there is provided a connection element or means between each two spring arms connected with the support and specifically those spring arms which do not belong to the same helical spring strap or bracket. The connection means or elements extend in the peripheral or circumferential direction of the associated tire.

The just-mentioned connection between the spring arms of two neighboring individual helical spring straps can either constitute a connection which is non-extensible in the presence of tractional forces, for instance, as might be provided by a clamp formed of one piece from flat metal or wire and flexed at both ends, or else, however, such connection can be afforded by a suitably constructed helical spring. In both cases, however, it is advantageous if the connection elements, when in use, are situated close to the region of the tread of the associated tire.

The anti-skid device of the invention as discussed above affords good stability since it enables an independent mobility of the individual straps through a certain limited extent, yet, however, also allows for partial transmission of forces exerted upon one strap to a neighboring strap.

The shock absorbing capability during radial load, as such occurs by virtue of the squeezing of the tire during loading and unloading, can however occasionally cause certain difficulties. For instance, if the resilient or spring arms are designed so that they are sufficiently softly resilient in order to properly take-up the mentioned spring or shock forces under pressure, then these spring arms generally are equally easily elongated or stretched by the action of the centrifugal forces at the unloaded portions thereof. A softly resilient material additionally possess relatively poor wear characteristics, which can be disadvantageous for the portions of the helical springs which lie over the tread of the tire.

A soft giving of the spring or helical bracket under load, in other words, then when it is located at its lower peripheral position at the tire and is in contact with the supporting surface or ground, is important for the purpose of increasing the riding comfort. At the same time, however, this flexibility or yieldability should not undesirably promote lifting of the portion of the spring bracket lying over the tread owing to the centrifugal forces.

Accordingly, a further objective of the present invention is to design the anti-skid device of the invention in such a way that it exhibits a soft rolling action while at the same time affording improved resistance against the centrifugal forces.

This objective of the invention is realized through the provision of a further connection element provided between both spring arms belonging to the same helical or spring bracket and which tend to bend-through the springs arms towards one another.

It is advantageous if the connection elements between the spring arms in both situations mentioned above themselves possess the form of helical springs, the elongation characteristics of which are chosen in accordance with the intended purpose for which such connection springs are employed. Hence, they allow for a considerable accommodation of the anti-ski device for the uses to which it is put.

The connection element which interconnects the spring arms belonging to the same helical spring bracket should be situated closer to the support than the connection elements for the spring arms which do not belong to the same helical spring bracket, so that the optimum effect of both types of connection arrangements is considerably increased.

The inventive anti-skid device can only then give softly and elastically under compressive or pressure load, in other words, when the relevant spring bracket or strap is in contact with the road surface, and this elastic giving action is such that the spring arms which are already flexed through towards one another intensify this bending action so that the hardness of the spring wires plays a less important role than if the helical spring is linearly compressively loaded in the usual sense. Also, the spacing of the individual coils of the helical or spiral springs, which should constitute a pressure spring, plays much less of an importance, so that in the case under consideration, apart from using the preferred pressure spring, it is also possible to use a tension spring.

Now, if, however, the centrifugal force strives to stretch the spring arms, then, the connection means provided between such spring arms can be selected to provide a randomly or optionally hard limiting mechanism so that, notwithstanding the softer resiliency, the tendency of the anti-skid device to increase in size in the peripheral direction under the action of the centrifugal forces can be maintained the same as before, generally however considerably smaller.

Since it is possible to use for the helical spring straps a harder steel when a softer resiliency or spring action is contemplated, it is also possible to increase the wear resistance.

To render possible easy assembly and disassembly of the anti-skid device of the invention, it is advantageous to connect an anchoring or attachment body with the wheel, the hub or the axle of the vehicle, at which anchoring or attachment body then it is possible to detachably connect the support. A particularly useful type of anchoring or attachment body contemplated by the invention incorporates an annular groove at its outer or jacket surface into which locking elements of the support can engage when an appropriately designed portion of the support is pushed over the anchoring body.

During attachment of the support with the anchoring body, it is especially advantageous if the support and anchoring body are mutually lockable with one another in the axial direction, yet permit a mutual rotation. Thus, the anti-skid device can carry out, to a limited extent, rotational movements relative to the wheel so that for instance, variations in the peripheral contour or diameter of the tire, as such might occur due to the presence of the tire pressure and the wear of the tire can be compensated. It is particularly surprising that the anti-skid device of the invention can nonetheless afford exceptional traction even in loose or uncompacted snow, because then there is very little frictional contact between the tire and the anti-skid body portions.

If the support is constructed so that it is equipped with essentially radial extending tubular elements into which the ends of the resilient or spring straps are inserted, then through the use of suitable means, for instance pins inserted through the tubular elements, it is possible to accommodate the diameter of the device easily to the wheel, affording a certain tolerance in the construction and design as well as the mounting of the anti-skid device.

BRIEF DESCRIPTION OF THE DRAWINGS

The invention will be better understood and objects other than those set forth above, will become apparent when consideration is given to the following detailed description thereof. Such description makes reference to the annexed drawings wherein.

FIG. 3 is a top plan view of the arrangement of FIG. 2, looking in the direction of the arrow VI thereof, and while eliminating the spring arm portions of the spring strap or bracket;

FIG. 4 is an axial sectional view through the support and the associated anchoring bodies;

FIG. 5 is an enlarged front view of the support without the anchoring body as viewed in the direction of the arrow VIII of FIG. 4;

FIG. 6 is a front view of a second embodiment of inventive anti-skid device mounted at a vehicle wheel equipped with a pneumatic tire;

FIG. 7 is a side view of the arrangement of FIG. 6, looking in the direction of the arrow II thereof;

FIG. 8 is an enlarged fragmentary sectional view through a radial arm of the support for the anti-skid device shown in FIG. 6, taken substantially along the lines III—III of FIG. 6; and FIG. 9 is an enlarged fragmentary sectional view of the arrangement of FIG. 6, taken substantially along the lines IV—IV thereof.

DETAILED DESCRIPTION OF THE PREFERRED EMBODIMENTS

Figure 1:
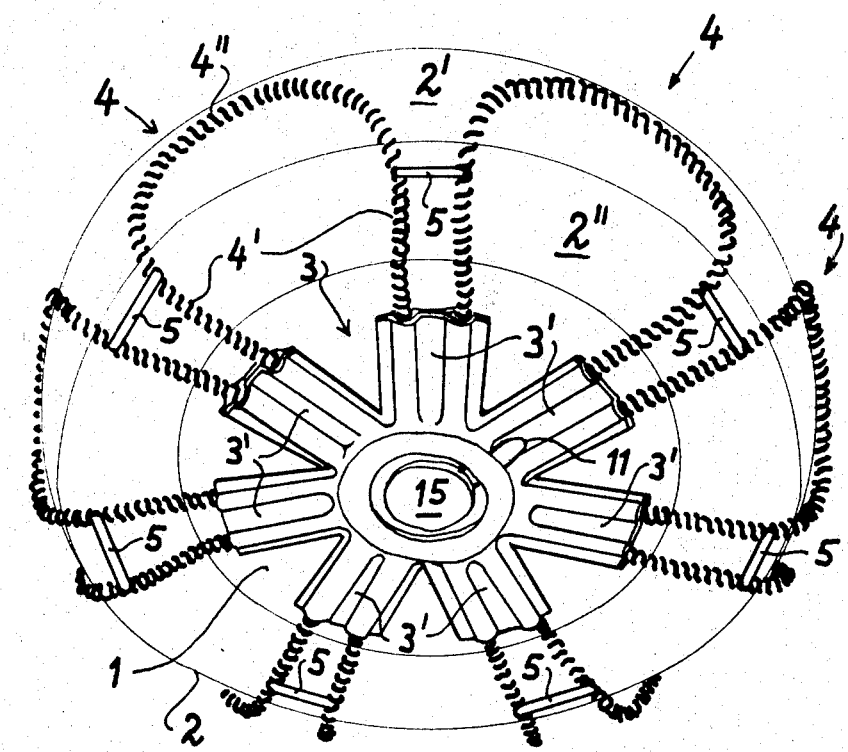
FIG. 1 schematically illustrates in perspective view as viewed at an inclination from the top a pneumatic tire for a vehicle and equipped with a first embodiment of inventive anti-skid device.

Describing now the drawings, in FIG. 1 there is illustrated a first exemplary form of inventive anti-skid device, and by referring to such figure, there will be recognize the vehicle wheel 1 equipped with a pneumatic tire 2. Pneumatic tire 2 possesses a tread 2' and an outer wall 2''. As will be discussed more fully in conjunction with FIGS. 4 and 5, a support or support body 3 equipped with, in this case, seven radially extending arm members 3', arranged in a substantially star-like configuration, is attached to the vehicle wheel 1. This support 3 is formed, for instance, from two high-polished galvanized or chromed sections 3a and 3b which are pressed from sheet metal and spot welded to one another.

As will be readily apparent by referring to any of FIGS. 2, 3, 5 and 6 at each radially extending arm member 3' of the supports 3 there are formed two tubular elements 3'' in which there can be inserted both ends of the seven loop-shaped resilient or spring straps or brackets 4 having radially extending portions formed to provide spring arms 4'. On the other hand, the portion of each spring strap 4 which extends over the tread 2' is provided to serve as the anti-skid body portion 4'' of each anti-skid spring strap 4. Each of the anti-skid spring-straps is here shown formed as a helical spring member.

Now with the arrangement shown in FIG. 1, connecting elements in the form of clamps 5 serve to couple the resilient or spring arms 4' of neighboring spring straps 4 with one another, whereby, importantly in each instance the arms 4' belonging to the same spring strap 4 are not connected with one another. Hence, it will be observed that the connecting clamp elements 5 which connect the arms of two different neighboring straps 4 to one another are also preferably located at the region of the tire walls 2'' in the neighborhood of the tread 2' and are arranged in such a way that they are situated as close as possible to this tread 2', yet during operation do not come into contact with the road surface or track along which the tire moves. Due to this arrangement, there is achieved that the spring arms 4' have imparted thereto a stabilization which extensively prevents any twisting or bending out of the spring straps 4. Notwithstanding the above, the elasticity and the fitting or matching capability of the device is positively retained.

Here it is mentioned that the connecting elements which have been shown in the arrangement of FIG. 1 in the form of the clamps 5 can also be replaced by helical springs, for instance of the type indicated in the modification of FIG. 6 at reference character 105. Also, the use of helical spring connection elements has the purpose of connecting the resilient or spring arms 4' of neighboring helical spring straps 4 to one another. Yet, it has the further advantage that the elasticity of the device is maintained much better than if there is used simply the clamps 5.

Figure 2:
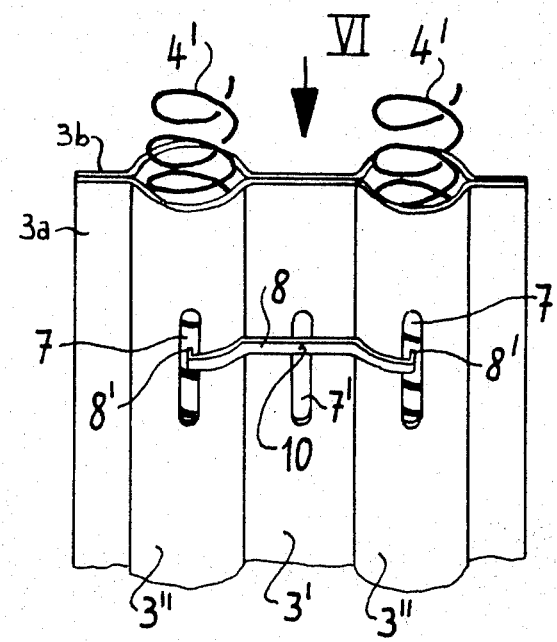
FIG. 2 illustrates on a large scale a portion of the support of the anti-skid device of FIG. 1, showing details of the attachment means for the spring strap.

In FIGS. 2 and 3 there is shown in greater detail the manner in which the spring arms 4' are inserted by means of their ends into the tubular elements or members 3'', the thus inserted spring arms 4' then being retained in position by the flexed ends 8' of a gripping element 8 associated with each pair of tubular elements 3''. Each such gripper element 8 is retained by a pressure spring 9, which bears upon bolt means 10 passing through the associated slot means 7' between the tubular elements 3'' in such a fashion that its flexed ends 8' penetrate into the corresponding hollow space of the associated tubular element 3'' and at that location engage with the coils of the associated spring arm 4'. Thus, on the one hand by virtue of the play which is thereby provided at the slots 7,7', there is afforded a certain mobility whereas, on the hand, by simply withdrawing each gripper element 8 against the action of the associated spring 9, it is possible to adjust or exchange the spring strap 4. This also simplifies disassembly of the anti-skid device if it is desired to store such in the smallest possible space. Of course, the gripper element 8 can possesses a different construction or can be replaced, if desired, by other suitable means such as, for instance, a simple wedge or splint which is inserted into the slots 7 provided at the tubular elements 3'', and which in this arrangement have been shown as receiving the flexed ends 8' of the gripper element 8.

FIG. 1 illustrates a portion of locking strap or bracket 11 which in that particular figure has been shown in exaggerated length, whereas in FIG. 5, for purposes of preserving clarity in illustration it has been depicted particularly shorter in length. As will be recognized by referring to FIGS. 4 and 5 this locking bracket or strap 11 possesses two substantially U-shaped legs 11' which, as best shown in FIG. 4, engage in the annular groove 12a of the substantially pot-shaped portion 12 of the anchoring or attachment body 13. This pot-shaped portion 12 of the anchoring body 13 will be seen to possess flanges 12' which may be attached by the screws 14, or other equivalent devices to the wheel, not particularly shown in FIG. 4. The substantially pot-shaped portion 12 will be seen to possess a cylindrical outer jacket or surface 120 which is snugly seated at the inner surface of the hub portion 15 of the support 3, as also can be seen by referring to FIG. 1. In so doing, there is of course a certain play which is present.

Now by referring to FIG. 5, there will be recognized that the locking strap or bracket 11 is retained in its locking position by means of a spring 16 which is connected with the hub portion 15 of the support 3. The legs 11' of the locking bracket 11 extend into tubular elements or receiving means 17 which are cut-out at the region 18, so that the locking bracket 11 shown in its work or effective position tends to engage by means of its legs 11' into the interior of the hub portion 15 and therefore with the aforementioned annular or ring-shaped groove 12a of the pot-shaped portion 12 of the attachment or anchoring body 13, whereas when the locking bracket 11 is retracted against the force of the spring 16, the inner width of the hub portion 15 is free.

Such type attachment of the support has the advantage that the support is rotatable in relation to the wheel, so that for instance differences in the outside diameter can be compensated. Additionally, this particular mode of attachment possesses the further advantage that it renders possible rapid exchange, that is to say mounting and dismantling of the anti-skid device at the tire. These mounting and dismantling operations can be perfected without lifting the wheel because the spring arms 4' of the spring straps 4 possess sufficient elasticity in order to place such into engagement with the lower region of the wheel or tire after the device has been locked to the wheel, or for dismantling or throwing such off the wheel when it is desired to remove the anti-skid device by slightly moving the car forward.

FIGS. 6 to 9 illustrate a modified version of the inventive anti-skid device wherein, in this instance, there is shown by reference character 101 the wheel. In FIGS. 6 and 7 there will be furthermore seen the pneumatic tire 102 and in FIGS. 6 and 9 there will be recognized the vehicle axle 101'. Also, as best observed by referring to FIGS. 6 and 7 there can be recognized the helical spring straps 104, FIG. 7 illustrating particularly well the portions 104' of the straps which bear upon the tire tread 102'. Also, in FIG. 6, there will be seen the manner in which the spring arms 104 extend from the strap portions 104'' to the substantially star-shaped support 150, which in this case, has six radially extending arms, as shown.

The neighboring spring arms of adjacently situated helical spring straps 104 are again connected to one another by the connection elements 105, which it will be recalled are here in the form of helical springs, whereas the spring arms 104' belonging to the same strap 104 are connected to one another by a further helical spring 200. Helical spring 200 serves the purpose of drawing or flexing towards one another the spring arms 104' of the same helical spring strap 104. As best seen by referring to FIG. 8, the spring arms 104' are clamped between the sections or halves 150' and 150'' of the star-shaped support 150, which sections are pressed together by the screws 151, or equivalent expedients, so that appropriately formed cylindrical surface portions 152' and 152'' define the tubular elements for receiving each such spring arm 104'. FIG. 8 also illustrates the above-discussed connection spring means 200 between the spring arms 104' of the same helical spring strap 104. FIG. 7 illustrates the location and arrangement of the connection elements 105 and 200 discussed above in relation to the other portions of the anti-skid device and the tire.

FIG. 9 schematically illustrates the vehicle axle 101' with the wheel plate 110 secured thereon by means of the screws 101" wherein the screw nuts 101" also connect a substantially pot-shaped anchoring body 111, similar to that shown in FIG. 4, with the axle 101'. The wheel 101 is attached in known manner by means of the nuts 110' to the wheel plate 110.

The anchoring body 111 possesses an annular or ring-shaped groove 112 in which the locking means 113 of the star-shaped support 115 engages when a counterpiece 114, welded or otherwise attached with the support 150, is pushed over the pot-shaped anchoring body 111. The locking means 113 is pressed by springs 115 into the groove 112 and can be removed therefrom by means of the pivot levers 116. In this connection, it is to be observed that the weights, shown in the form of balls, located at the outer ends of the levers 116 ensure by virtue of the centrifugal force a positive seating of the locking means or locking elements 113 in the annular groove 112 during operation. By inwardly pressing the ends of the levers 116, it is possible to release the locking elements 113 and to remove the entire device. The pot-shaped element 111 remaining at the vehicle can easily be protected by the hub cap of the wheel.

Thus, while enjoying a positive seating action and an attachment which ensures against loss the anti-skid device nonetheless can carry-out a rotational movement relative to the wheel and therefore to the pot-shaped member 111, so that it can better accommodate to the squeezing movements to which the tire or wheel is subjected.

The inventive anti-skid device is advantageously formed of a suitable metal, it can, however, be formed of other suitable materials, plastic for instance.

While there is shown and described present preferred embodiments of the invention, it is to be distinctly understood that the invention is not limited thereto but may be otherwise variusly embodied and practiced within the scope of the following claims. Accordingly,

What is claimed is:

1. An anti-skid device for the wheels of vehicles, comprising a support which can be attached to a part of the vehicle defined by either the wheel, the hub or the axle of the vehicle, a plurality of helical spring straps, each said strap having a pair of ends defining spring arms spanningly attached with said support to provide a substantially star-like configuration of said straps at said support, each said strap protruding outwardly from said support and having a portion extending from the associated ends thereof in flexed fashion over the tread of the tire, and connection means between each two neighboring ones of said spring arms which do not belong to the same helical spring strap, said connection means being disposed at the region of the sidewall of the tire, near the tread and extending approximately in the peripheral direction of the tire.

2. The anti-skid device as defined in claim 1, further including additional connection means arranged between both spring arms belonging to the same helical spring strap and serving to bend such spring arms towards one another.

3. The anti-skid device as defined in claim 2, wherein at least one of both aforementioned connection means comprises helical springs.

4. The anti-skid device as defined in claim 2, wherein said additional connection means situated between the spring arms belonging to the same helical spring strap is located closer to said support than said connection means located between the spring arms belonging to different helical spring straps.

5. The anti-skid device as defined in claim 2, further including an anchoring body secured to said part of the vehicle, and attachment means for connecting the support detachably and rotatably with said anchoring body.

6. The anti-skid device as defined in claim 1 wherein each of said helical spring straps comprises a substantially U-shaped element when in secured position, said spring arms merging with one another along a portion of the tire tread in the peripheral direction thereof to provide additional anti-skid surface.

* * * * *